Nov. 23, 1937. M. H. LANG 2,099,897
ADJUSTABLE CUSHION FILLING MACHINE
Filed May 11, 1935 2 Sheets-Sheet 1
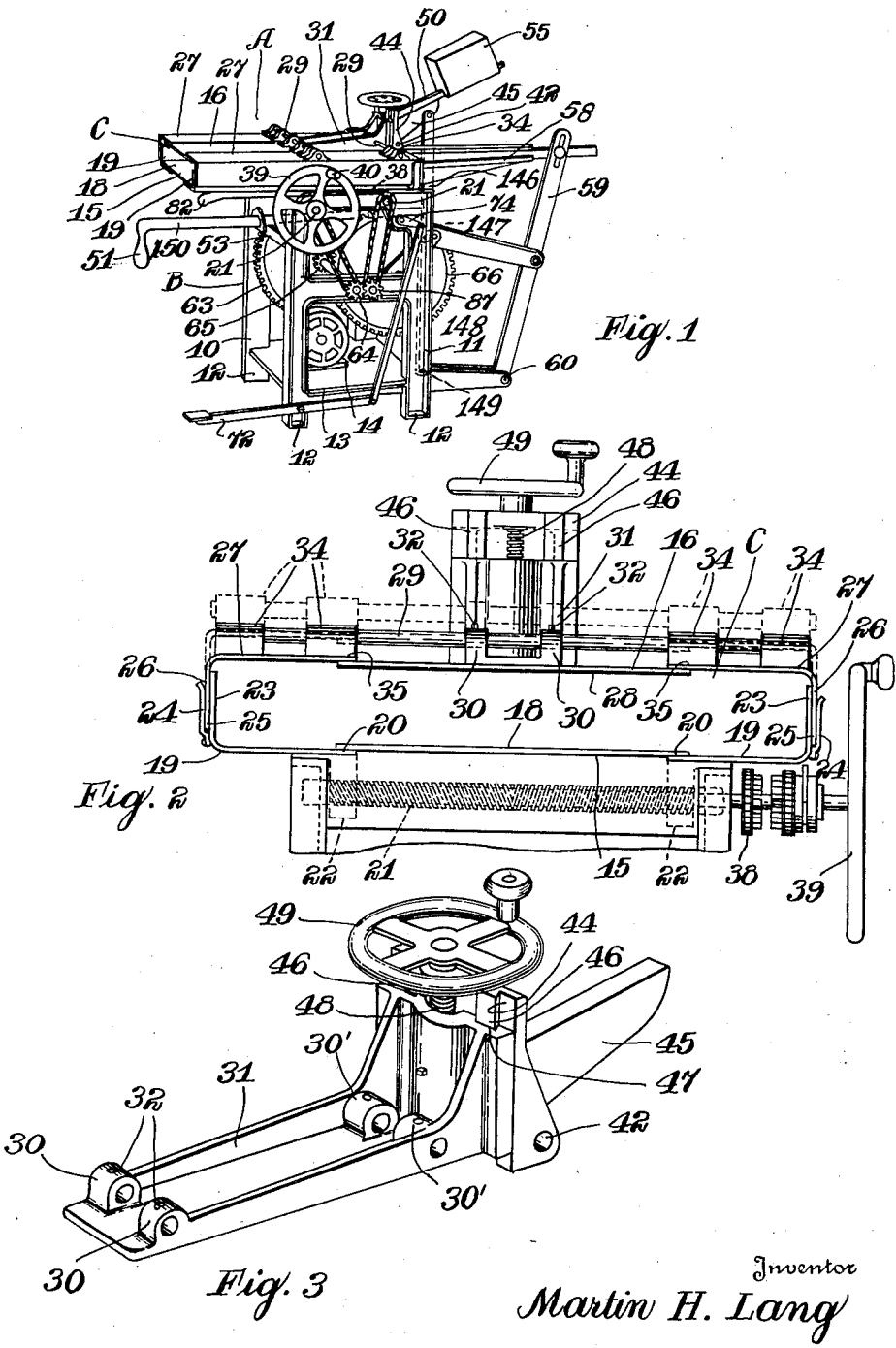
Inventor
Martin H. Lang
By Horaw Pricke
Attorney Nov. 23, 1937.                M. H. LANG                2,099,897
               ADJUSTABLE CUSHION FILLING MACHINE
                    Filed May 11, 1935        2 Sheets-Sheet 2

Inventor
Martin H. Lang

By

Attorney

Patented Nov. 23, 1937

2,099,897

UNITED STATES PATENT OFFICE 2,099,897

ADJUSTABLE CUSHION FILLING MACHINE

Martin H. Lang, Minneapolis, Minn.

Application May 11, 1935, Serial No. 21,006

8 Claims. (Cl. 226—46)

This invention relates to adjustable cushion filling machines which are designed to operate automatically to force the material into the cushion under compression so as to fill the cushion as the material expands into the cushion cover.

A feature resides in providing an adjustable stuffing box which may be adjusted laterally and vertically to the desired size. The stuffing box is thus formed expandable and by the adjusting means the same may be adjusted to the desired size, both as to width and thickness of the cushion. The stuffing material is placed in the stuffing box and compressed thereby and then the cushion covering is slipped over the end of the stuffing box and by means of the ejecting plunger which operates in the stuffing box the stuffing material is pushed into the cover of the cushion automatically.

The general operation of my cushion filling machine is the same as that disclosed in my Patent No. 1,724,030, and I have added thereto an adjusting means which permits the stuffing box to be quickly adjusted to the desired size in relation to the thickness of the cushion to be filled by my machine. Thus it is possible for my cushion filling machine to be more readily adjusted as to the thickness of cushions filled by the same.

The adjusting means for regulating the thickness of the stuffing box of this filling machine includes the operating wheel which raises or lowers the upper adjustable plates of the stuffing box, thereby adjusting the compartment of the stuffing box as to the vertical space between the top and bottom plates of the stuffing box.

In the drawings forming part of this specification:

Figure 1 is a perspective view of my adjustable cushion filling machine.

Figure 2 is an enlarged front elevation in detail of the stuffing box and the adjustable bracket for the top plates of the same.

Figure 3 is a perspective view of the bracket which I employ, showing the operating handle and supporting guide plate for the bracket.

Figure 4:
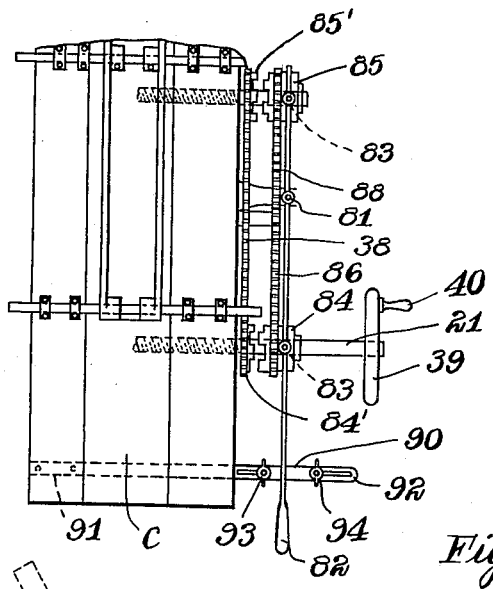
Figure 4 is a plan view of a portion of my machine.

My cushion filling machine A is made up in a simple manner, having a compact construction which permits the cushion filling material to be placed in felt receiving stuffing box C. The stuffing box C is made up of the lower portion 15 and the upper portion 16. The lower portion 15 is rigidly fixed to the top of the side plates 10 and 11 which form the frame so as to be held in an approximately horizontal plane, practically parallel with the floor on which the legs of the machine A rest. It is apparent, however, that the portion 15 of the stuffing box C can be attached in any suitable manner or in any angular position that may be desired.

The lower part 15 and the upper part 16 of the stuffing box C are formed of sections to permit the same to slidably fit together so that the stuffing box C may be adjusted as to size both as to the width and height of the same.

The lower portion 15 is provided with a central plate-like portion 18 which is held rigidly in place centrally of the base portion B, while the portions 19 are slidably held with the edge 20 overlapping the outer longitudinal edge of the plate 18 as illustrated in Figure 2. The end members 19 are carried by the threaded shaft 21 which is provided with right and left hand portions adapted to engage in the bracket supporting members 22 which are secured to the members 19.

The members 19 are right angular in shape, having upwardly extending side walls 23 to which are secured guides 24 which are spaced from the outer vertical surfaces of the members 19 to form longitudinally extending recesses 25 along the outside of the walls 23. The recesses 25 are adapted to receive the depending sides 26 which are formed on the angular side members 27 of the top 16 of the stuffing box C.

The top 16 of the stuffing box C is made up similar to the bottom 15 and is provided with a central plate portion 28 which is held by two transversely extending shafts 29 which extend across the top of the cover 16 and which are adapted to extend through the bosses 30 formed on the front end of the arm 31. The shafts 29 extend parallel to each other and the arm 31 engages these shafts centrally between the ends, one shaft 29 passing through the bosses or journals 30 and the other through the bosses or journals 30', as illustrated in Figure 3.

Set screws 32 are adapted to hold the shafts 29 in position so that the ends of the shafts 29 extend approximately equal on either side of the bracket arm 31.

The angular portions 27 of the cover 16 are slidably supported by the outer ends of the shafts 29 by the bearings 34 which are secured to the angle members 27. The inner ends of the angle members 27 overlap at 35 with the outer longitudinal edges of the plate 28. Thus the angle plate members 27 are slidable toward and away from the center of the plate member 28.

When the stuffing box C is closed, as illustrated in Figures 1 and 2, the edges 26 engage in the recesses 25 of the angle member 19 and by the operation of the screw members 21 the stuffing box can be adjusted to the desired width, by operating the screws 21 in the direction desired. The operation of the screws 21 expands or contracts the stuffing box C which adjusts the width of the same. The operating screws 21 for adjusting the width of the stuffing box C are adapted to be operated in unison by the connecting chain 38 which operates over suitable sprockets carried on the ends of the shafts 21 which project from the side wall 11 of the machine A. One of the shafts 21 carries a hand wheel 39 and a handle 40 which permits the operator to easily operate the screws 21 by rotating the same. Thus the operator can readily operate the screws 21 so as to adjust the width of the stuffing box C.

The arm 31 which supports the cover 16 of the stuffing box C is pivotally connected at 42 to suitable brackets 43, which project from the top of the frame B at the back of the same. The arm 31 is adapted to be slidably supported by the cross head 44 from which projects rearwardly a member 45. The cross head 44 is formed with guides 46 which have a dove-tailed connection in the slots 47 formed in the rear upright end of the arm 31. The arm 31 and the cross head 34 are adjusted in relation to each other by means of the screw 48 which is adapted to be operated by the handle 49. Thus when the handle 49 is operated, the arm 31 can be adjusted to adjust the top 16 in relation to the bottom 15 of the stuffing box C. This provides an adjustment for regulating the depth of the stuffing box and permits a thicker or thinner cushion stuffing material to be supported in the stuffing box C.

The projection 45 provides a means of supporting the arm 50 which adjustably supports the weight 55 on the outer end of the same. The weight 55 is adapted to act as a counterbalancing means for the top 16 and permits the top 16 to be raised around the pivot point 42 so that the stuffing material may be easily placed in the bottom 15 of the stuffing box C when the top 16 is swung into open position.

A pinion 62 on the motor 14 engages the gear 63 mounted on the shaft 64. A pinion 65 on the shaft 64 engages a gear 66, acting to rotate the crank arm 79 connected by the link 78 to the link arm 59, which is pivotally connected at 60 to the bracket 61. A plunger arm 57 is pivotally and slidably connected to the link arm 59, and is operated thereby. The plunger arm 57 slides in a bracket 58 projecting from the rear portion of the machine, and operates the plunger arm 57, shown in Figure 2, to force the filling material into the covering.

Figure 5:
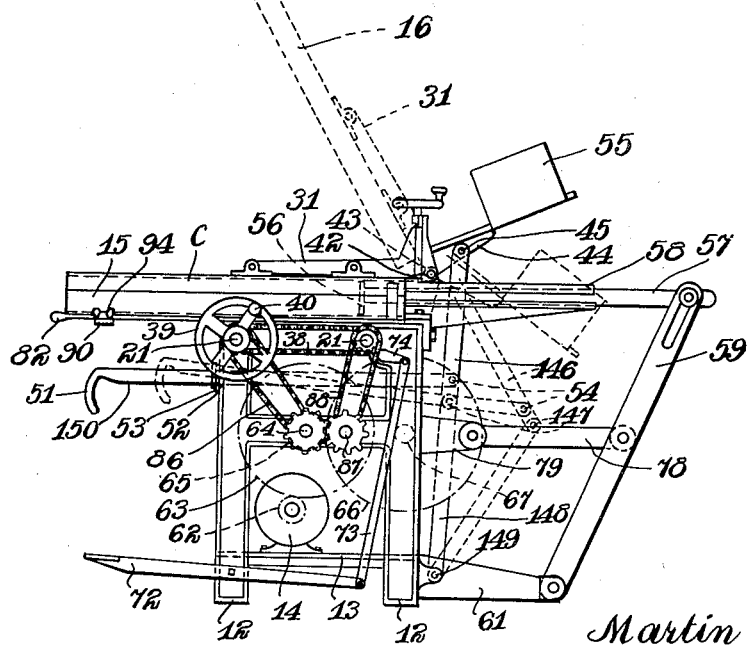
Figure 5 is a side view of my machine.

The arm 31 is provided with an outwardly projecting end 44 which is pivotally connected at 45 to the link 146, while the link 146 is pivoted at 147 to a second link 148, and this link 148 is pivotally connected at 149 to the lower part of the frame B, as is illustrated in Figure 5 of the drawings. In this manner toggle levers are provided at the links 146 and 148 for the operation of the arm 31 so as to raise and lower the top 16 of the stuffing box C. To facilitate the easy operation of the toggle links 146 and 148 I provide an operating handle 150 formed with a hand engaging end 51 and which is provided with a notch 52 which engages over the shoulder bar 53 along the front face of the base B. This permits the handle to be locked into closed position as the weight of the outer handle end 51 beyond the shoulder 52 is sufficient to hold the handle on the shoulder bar 53, and thus hold the cover 16 locked down into closed position, as illustrated in full lines in Figure 5. When the cover 16 is opened the handle 150 is raised off of the shoulder bar 53 so that the notch 52 is disengaged therefrom and by pushing backward on the handle, the inner end of which is pivoted at 54 to the toggle link 146, the links 146 and 148 are operated into the position in dotted outline to raise the cover 16 by pulling down on the lever end 45 of the arm 31.

To operate the adjustment of the width of the stuffing box C I provide an operating handle 80 which is pivotally connected to the frame at 81, and is formed with a hand engaging end 82. Pivotally connected to the lever 80 I provide yokes 83 which engage in the collars of the clutch members 84 and 85 respectively. The clutch members 84 and 85 are freely rotatable on the ends of the shafts 21 and are adapted to be held in neutral or inoperative position by the lever 80. The lever 80 can be moved so as to throw the clutch 84 into engagement with a complemental clutch portion 84', by moving the handle 80 in one direction, and by moving the handle in the other direction from neutral position, illustrated in Figure 4, the clutch member 85 can be thrown into the complemental clutch member 85'. The clutch members 84' and 85' are carried by the sprocket wheels which carry the chain 38 of the machine A, and these sprocket members are carried to the shaft so as to operate the same when either one of the shafts 21 is rotated.

The shaft 64 carries a sprocket wheel which is adapted to operate the chain 86 which operates the clutch member 84 and by means of a gear connection the shaft 87, which is positioned adjacent the shaft 64, is adapted to be operated by the shaft 64, and to operate the chain 88 carried on a sprocket wheel on the shaft 87 and adapted to extend up to a sprocket on the clutch 85. Thus the chains 86 and 87 operate the clutch members 84 and 85 continuously during the operation of the machine A and are adapted to operate the clutch members 84 and 85 so that they can be thrown into engagement with the complemental clutch members 84' and 85' whenever it is desired, by engaging the handle portion 82 of the lever 80. When the operator of the machine A desires to close the sides of the stuffing box C together to narrow the width of the same, he throws the lever 80 into position to cause the clutch member 84 to operate with the complemental clutch member 84'. When he desires to open or increase the width of the stuffing box C he throws the lever into position to operate the clutch member 85 with the member 85', thus operating the screw members 21 either in one direction or the other, owing to the difference in rotative operation of the chains 86 and 88, one running in one direction and the other in the opposite direction.

To permit the operation of releasing the lever 80 into neutral position in the operation of the machine A, I provide a lever arm 90 which is connected to the lower portion of the stuffing box, at one of the angle members 19 at 91. The outer free end 92 of the arm 90 carries adjustable pins 93 and 94 which are positioned one on either side of the handle 80. These stop pins 92 and 93 can be set at the desired position on the lever arm 90 so that in the operation of the screw members 21, the clutches 84 and 85 can be disengaged automatically when the position of the sides of the box C assume a predetermined point.

Thus in the operation of the machine A when the clutch 84 is thrown into operation to rotate the shafts 21 in a direction to draw the sides of the stuffing box C together or toward each other, when the sides reach the desired position on each side of the center plates 18 and 28, the pin 93 will strike the operating end 82 of the lever 80 to disengage the clutch 84 and throw it into neutral position. On the other hand, when the clutch 85 is operated to rotate the shafts 21 into the opposite direction to open or spread the sides of the stuffing box C apart, when the sides have assumed the desired position, the stop pin 94 will engage on the other side of the handle 80 to disengage the clutch 85 and throw the same into neutral position. This operation of the machine is entirely automatic and permits the operator to freely operate the other parts of the machine without concern, after he has operated the lever 80 into the position desired. The adjustment of the pins 93 and 94 permit the setting of the automatic operation of the lever 80 to the desired position, so that the lever 80 will be operated at the proper time.

The operation of my machine A is simple and is carried out primarily as defined in my Patent No. 1,724,030, dated August 13, 1929. The foregoing description of the alternative automatic construction clearly defines the automatic operation as described in my former patent. With these features as set forth in that patent, I have included the adjustable means of the arm 31 which is easily operated by the handle 49 to raise or lower the top 16 in relation to the bottom 15. Manual operation of my device is relatively simple. When the operator has adjusted the stuffing box C as to the width by means of the handle 39 while the bottom and top of the stuffing box are in closed position as illustrated in Figures 1 or 2, then the depth between the bottom and top is regulated by the handle 49, after which the top 16 is swung open and the stuffing material placed therein; then the top 16 is closed over the same and the cover of the cushion is slipped over the end of the stuffing box C into the desired position, and then a suitable ram 56 within the stuffing box is automatically operated by the power of the motor 14 to push the stuffing material into the covering and simultaneously the covering is slid off of the stuffing box C, whereupon the cushion material is neatly contained within the covering of the cushion and it is only necessary to close the open end of the covering to complete the cushion.

These features define my adjustable cushion filling machine and while they have been illustrated and shown in the drawings of a particular construction, it is obvious that such variations as may be apparent to those skilled in the art may be made within the scope of the following claims, without departing from my invention.

I claim:

1. A stuffing machine including an adjustable stuffing box including upper and lower sections having means for adjusting the width thereof, a base upon which said sections are mounted, means for adjusting the depth of said stuffing box, means for operating said stuffing machine to automatically insert the stuffing material into the cushion covering and hinge means for said upper sections interposed between said stuffing box depth adjusting means and said base.

2. A stuffing machine including, a base portion, a stuffing box formed with upper and lower adjustable sections supported by said base portion, means for adjusting said sections to vary the width thereof, means for adjusting the sections to vary the height of said stuffing box including two relatively adjustable parts, means connecting one of said parts to said upper section, and means pivotally connecting said other part to said base.

3. A stuffing machine including, a base portion, a stuffing box supported on said base formed of a series of sectional members adjustably connected together, means for hingedly supporting some of said sections to permit the stuffing box to be readily opened, counterbalancing means for said hingedly supported sections, means for adjusting the width of said stuffing box, means interposed between said some sections and said hingedly supporting means for adjusting the depth of said stuffing box, means connected to said adjusting means adjacent said hingedly supporting means for pivoting said some sections, the adjustable sections of said stuffing box overlapping, and forming when closed a compartment for receiving the stuffing material which is to be stuffed into a cushion covering, and means for automatically ejecting the stuffing material while simultaneously filling the cushion covering.

4. A cushion filling machine including a contractable cushion filling box having top and bottom portions, means for operating said box to contract or expand the same to any predetermined width, releasing means for disengaging the power operating means in the expanding or contracting operation of said box, pivotal mounting means for said top portion, and means connected between said pivotal mounting means and said top portion for adjusting said stuffing box to receive cushion filling materials of different depths.

5. A cushion filling machine including an adjustable stuffing box having top and bottom portions, power means for adjusting the width of said stuffing box, a fixed pivot to which said top portion is secured and hand adjusting means interposed between said top portion and said pivot for adjusting the depth of said stuffing box.

6. A cushion filling device comprising a base portion, a stuffing box mounted on said base portion having upper and lower members made up of a series of overlapping plates, means for hingedly supporting said upper portion of said stuffing box to permit said stuffing box to be opened wide so that stuffing material may be easily laid within the same, means for adjusting the width of said overlapping plates of said stuffing box, and means interposed between said upper members and said hingedly supporting means for adjusting the depth of said stuffing box when it is closed.

7. A cushion filling machine including an adjustable stuffing box including top and bottom portions, means for adjusting said stuffing box as to the width thereof, means for adjusting said stuffing box as to the depth thereof, said depth adjusting means including an arm for supporting the top portion of said stuffing box, a cross head pivotally secured to said bottom portion for slidably supporting said arm, and screw means for adjusting said arm in relation to said cross head.

8. A cushion filling machine including a stuffing box made up of a series of overlapping adjustable plates, means for adjusting said plates to overlap more or less in the width to adjust the width of said stuffing box, means for adjusting the depth of said stuffing box by changing the overlapping position of the top and bottom portions of said stuffing box, said depth adjusting means including a slidable bracket supported upon a cross head, dove-tailed guides for connecting said bracket to said cross head, and screw means for adjusting said bracket in relation to said cross head.

MARTIN H. LANG.